US006496515B2

(12) United States Patent
Lefebvre et al.

(10) Patent No.: US 6,496,515 B2
(45) Date of Patent: *Dec. 17, 2002

(54) METHOD FOR PRIORITISED DATA TRANSMISSION AND DATA TRANSMISSION ARRANGEMENT

(75) Inventors: Pascal Albert Emile Lefebvre, Brussels (BE); Philippe Guillaume Dobbelaere, Wilrijk (BE)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,750

(22) Filed: May 26, 1998

(65) Prior Publication Data

US 2002/0118691 A1 Aug. 29, 2002

Related U.S. Application Data

(60) Provisional application No. 60/052,125, filed on Jul. 10, 1997.

(30) Foreign Application Priority Data

May 26, 1997 (EP) .............................. 97401146

(51) Int. Cl.$^7$ .............................................. H04L 12/42

(52) U.S. Cl. .................. 370/455; 370/461; 370/462; 370/463

(58) Field of Search .................. 370/389, 395, 370/413, 415, 428, 412, 445, 537, 447, 449, 451, 452, 461, 462, 463, 455

(56) References Cited

U.S. PATENT DOCUMENTS

| 5,499,238 | A | | 3/1996 | Shon | |
|---|---|---|---|---|---|
| 5,673,265 | A | * | 9/1997 | Gupta et al. | 370/432 |
| 5,737,334 | A | * | 4/1998 | Prince et al. | 370/395 |
| 5,933,607 | A | * | 8/1999 | Tate et al. | 295/200.7 |

FOREIGN PATENT DOCUMENTS

| EP | 0584405 A1 | * | 3/1994 | ........... H04L/12/56 |
|---|---|---|---|---|
| EP | 0584405 | | 3/1994 | |

OTHER PUBLICATIONS

Landsberg et al "Generic Queue Scheduling: Concepts and VLSI". Proceedings of the Conference on Computer Communications (Infocom), Toronto, Jun. 12, 1994, vol. 3, 1438–1445.

Hyman et al: "Mars": The Magnet II Real–Time Scheduling Algorithm, Proceedings of the Conf. on Commun. Architectures and Protocols, Sep. 3–6, 1991, pp. 285–293.

* cited by examiner

Primary Examiner—Alpus H. Hsu
Assistant Examiner—Thien Tran
(74) Attorney, Agent, or Firm—Ware, Fressola, Van Der Sluys & Adolphson

(57) ABSTRACT

A method for prioritized data transmission to a common transmission medium from a plurality of interface modules coupled to it, for interfacing at least one input bitstream with said common transmission medium, whereby access is arbitrated on the basis of a module priority of each interface module, is such that, for at least one interface module, the module priority is dependent on at least one connection parameter associated to packets of said at least one input bitstream. An arrangement for performing this method is described as well as several variant implementations of the method and the arrangement.

24 Claims, 3 Drawing Sheets

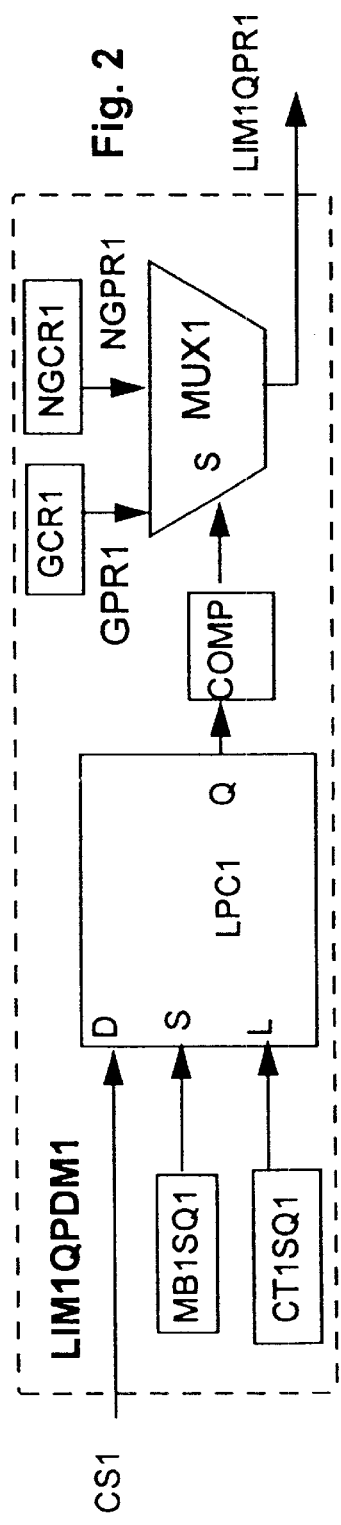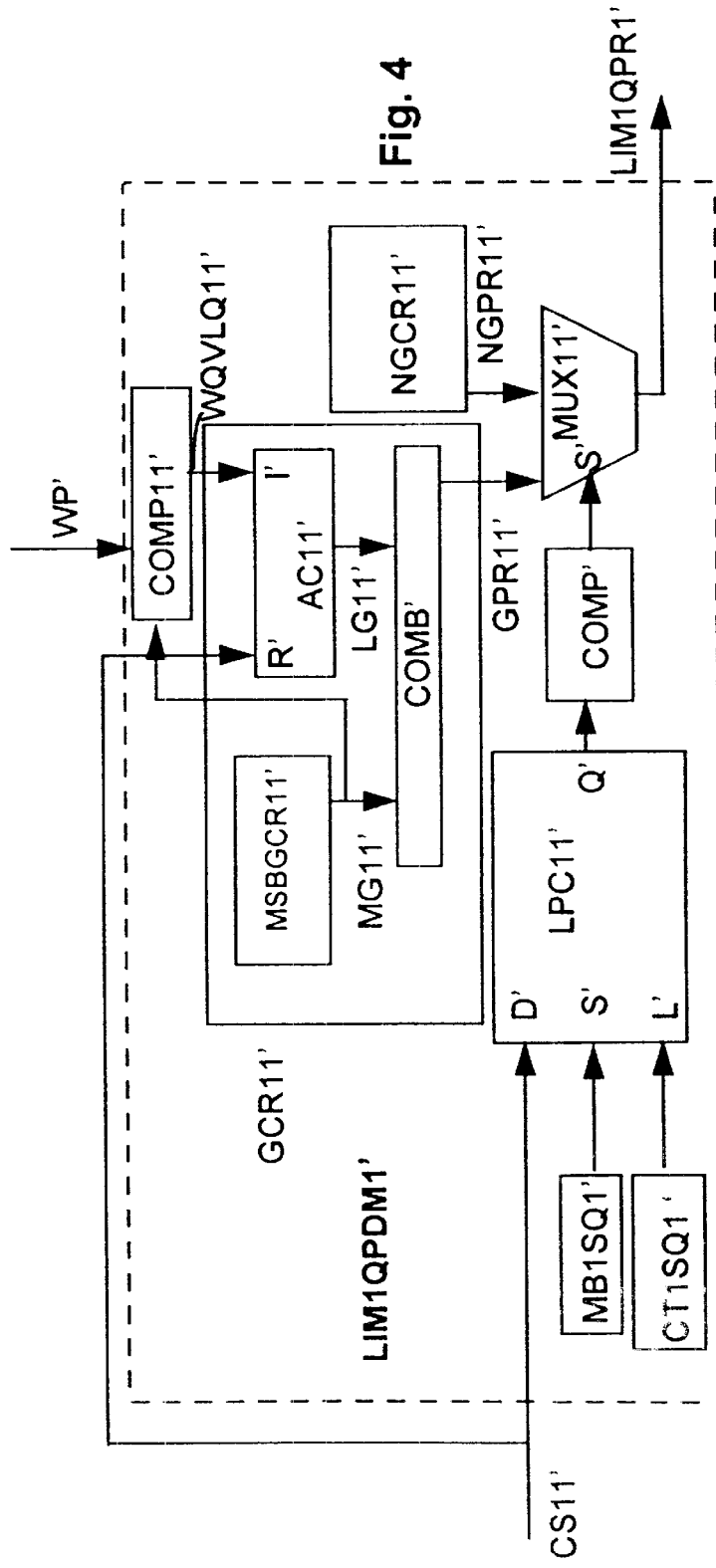

METHOD FOR PRIORITISED DATA TRANSMISSION AND DATA TRANSMISSION ARRANGEMENT

In addition to claiming priority under 35 USC §119(a) from EPO application 97401146.2 filed May 26, 1997, this application also claims the benefit under 35 USC §119(e) of U.S. Provisional Application No. 60/052,125, filed on Jul. 10, 1997.

TECHNICAL FIELD

The present invention relates to a method for prioritised data transmission to a common transmission medium of a plurality of interface modules coupled to it, and interfacing at least one input bitstream with the common transmission medium, each interface module of the plurality having a module priority on the basis of which access to said common transmission medium is arbitrated during a grant cycle. The invention also relates to a data transmission arrangement including a plurality of interface modules, for interfacing at least one input bitstream with a common transmission medium, each interface module including at least one storage queue adapted to store packets of the at least one input bitstream prior to accessing the common transmission medium, the each interface module having a respective module priority on the basis of which access to the common transmission medium is arbitrated during a grant cycle, and which is determined by an interface module priority means included in the each interface module.

BACKGROUND OF THE INVENTION

A data transmission arrangement for performing such a method is already known in the art, e.g. from the Published European patent application, publication number EP 0584405 A1, entitled: "Data transmission system and interface module and priority generation means included therein". Therein, a data transmission system or arrangement, including a plurality of interface modules, interfacing a plurality of input bitstreams with a common transmission medium, is described, wherein each interface module includes storage means, each including storage registers or storage queues, adapted to store packets of said input bitstreams prior to accessing said common transmission medium. Each of the interface modules described in the prior art document additionally includes packet priority determining means adapted for generating, for each of the packets stored in said storage means, a packet priority as a function of its storage time in said storage means and of at least one packet characterising parameter. Each interface module of the prior art data transmission arrangement is further granted access to the common transmission medium, based on an interface module priority, which is itself determined from the individual packet priority values associated to the individual packets stored within this interface module.

In case the input bitstream consists of an ATM input bitstream, the prior art method and arrangement does however not provide for prioritised access between different ATM service categories, to which individual packets of this bitstream are associated. Indeed, in the prior art method and arrangement, the interface module priority on the basis of which the prioritised access is granted, and determined from the packet priority of the packets of the bitstreams, is merely dependent upon the storage time of these packets in the storage queue, and upon at least one packet characterising parameter. Some examples of such a packet characterising parameter are referenced in the prior art document as being the packetising delay during the packetising process in the packetising means, described in the prior art document, or as related to the type of information contained in the packets, for example to make a distinction between data and voice. No reference is however made to a connection parameter. Since the ATM service category is however determined by a combination of both Quality of Service parameters such as cell delay variation, cell transfer delay and cell loss ratio, and traffic parameters such as peak cell rate, sustainable cell rate maximum burst size, and minimum cell rate, all of which are not parameters inherently characterising the packet itself, but characterising the connection associated to part of the input bitstream of which the packet forms part, the referenced prior art method is not adapted for providing access amongst a number of competing ATM service category bitstreams, entering at least one interface module, to the common transmission medium.

SUMMARY OF THE INVENTION

An object of the present invention is thus to provide a method and data transmission arrangement for realising prioritised data transmission between different ATM service categories.

According to the invention, this object is achieved by letting at least one interface module priority to be dependent upon at least one connection parameter.

Such an object is achieved by a method for prioritised data transmission to a common transmission medium of a plurality of interface modules coupled to it, and interfacing at least one input bitstream with the common transmission medium, each interface module of the plurality having a module priority on the basis of which access to the common transmission medium is arbitrated during a grant cycle, wherein for at least one interface module amongst the plurality, the module priority is dependent on at least one connection parameter associated to packets of the at least one input bitstream.

This object is also achieved by a data transmission arrangement including a plurality of interface modules, for interfacing at least one input bitstream with a common transmission medium, each interface module including at least one storage queue adapted to store packets of the at least one input bitstream, prior to accessing the common transmission medium, each interface module having a respective module priority on the basis of which access to the common transmission medium is arbitrated during a grant cycle, and which is determined by an interface module priority means included in the each interface module, wherein, for at least one interface module amongst the plurality, the module priority is dependent on at least one connection parameter associated to the packets of the at least one input bitstream.

Indeed, since the value of one or a combination of the values of these connection parameters is directly related to a specific ATM service category, and since the interface module priority is now determined by at least one of these connection parameters, the access arbitration, based on interface module priorities is now adapted to differentiate between different ATM service categories.

An additional characteristic feature of the present invention is that said method further includes a first step of routing at least part of the packets of the at least one input bitstream into at least one storage queue of the at least one interface module, based on the values of the at least one connection parameter, whereby each distinct storage queue amongst the at least one storage queue corresponds to a distinct predetermined combination of values of the at least one connection parameter, whereby for the each distinct storage queue, a distinct queue priority associated to the each distinct storage queue is determined, from which the interface module priority of the at least one interface module is further determined and that said data transmission arrangement is further adapted where the data transmission arrangement further includes routing means, adapted to route at least part of the packets of the at least one input bitstream towards the at least one storage queue included in the at least one interface module, based on the value of the at least one connection parameter, whereby each distinct storage queue amongst the at least one storage queue of the at least one interface module corresponds to a distinct predetermined combination of values of the at least one connection parameter, and is further associated to a distinct queue priority determining means included in the at least one interface module and being adapted to calculate a distinct queue priority associated to each distinct storage queue, whereby the interface module priority means of the at least one interface module is further adapted to determine the interface module priority from each of the distinct queue priorities associated to the each distinct storage queue of the at least one interface module.

As a result of this, by associating specific storage queues to specific ATM service categories, as is obtained by the correspondence of each storage queue to a distinct predetermined combination of values of said at least one connection parameter, and by determining a distinct queue priority per specific storage queue from which the interface module priority is determined, a simple implementation of the above mentioned principle is obtained.

A further characteristic feature of the present invention in case the at least one storage queue consists of one storage queue the interface module priority corresponds to the queue priority associated to the one storage queue; and wherein the data transmission apparatus has a corresponding apparatus feature.

Thereby, in case the interface modules only include one storage queue, the obtained queue priorities directly correspond to the interface module priorities. In this special case each interface module in fact only receives data associated to one specific ATM service category, as will be explained more into detail in a further paragraph.

Still another characteristic feature of the present invention for the each distinct storage queue, the distinct queue priority is selected from a distinct predetermined set of values; and wherein the data transmission apparatus has a corresponding apparatus feature.

In this way, priority differentiation amongst the different ATM service categories is obtained by selecting the queue priorities associated to these different ATM service categories, from distinct predetermined sets of values.

Yet a further characteristic feature of the present invention is the distinct predetermined sets of values, related to the distinct storage queues are non-overlapping; and wherein the data transmission apparatus has a corresponding apparatus feature.

By letting these distinct predetermined sets of values to be non-overlapping sets, the aforementioned differentiation is even more pronounced. In addition, the connection admission control function, although not being subject of this present invention, but being an essential part of the network of which this data transmission arrangement of the present invention forms part, is seriously simplified.

Another characteristic feature of the present invention is for at least one specific storage queue amongst the at least one storage queue, the queue priority associated to the at least one specific storage queue, is adapted at predetermined instances; and wherein the data transmission apparatus has a corresponding apparatus feature.

Thereby, by adapting the priority of a particular storage queue at predetermined instances, the possibility of guaranteeing a minimum cell rate is foreseen. This is especially valuable for these specific ATM service classes for which no total bit rate is specified, such as the available bit rate category. By, at predetermined instances temporarily increasing the associated queue priority, leading to an increased probability of gaining the access, yet a minimum transmission of cells of this service category is provided.

Yet a further characteristic feature of the present invention is the predetermined instances are related to the at least one specific storage queue; and wherein the data transmission apparatus has a corresponding apparatus feature.

In this way a further differentiation, but now between these specific ATM service classes for which the total bit rate is not specified such as for instance the available bit rate and the unspecified bit rate class, is provided, enabling to favour some of these categories with respect to others.

Yet another characteristic feature of the present invention is the predetermined instances are further related to a predetermined amount of calls to be transmitted from the at least one specific storage queue; and wherein the data transmission apparatus has a corresponding apparatus feature.

Thereby, by further relating the predetermined instances at which the priority of the specific ATM service categories is adapted, to predetermined amounts of cells to be transmitted from the associated storage queue, yet a fine tuning of the minimum guaranteed cell rate in these categories is provided. This results in even a more versatile method and arrangement.

Still a further characteristic feature of the present invention is the respective queue priority associated to the at least one specific storage queue, is alternatively selected, at the predetermined instances from at least two predetermined sets of values, each of which is related to the at least one respective storage queue; and wherein the data transmission apparatus has a corresponding apparatus feature.

In this way, a simple, low cost, implementation of the temporary varying priority for these specific ATM service categories is obtained.

Still another characteristic feature of the present invention is for the at least one specific storage queue, the at least two predetermined sets of values are non-overlapping; and wherein the data transmission apparatus has a corresponding apparatus feature.

As a result, a clear and marked differentiation between the temporarily varying priority values of these specific ATM service categories is obtained. By further combining this with the principle described in claims 5 and 18, all priority values related to all distinct ATM service categories, are distinctly marked.

Yet another characteristic feature of the present invention is for the method being applicable to a first interface module and a second interface module of the plurality, each respectively including a first, respectively a second, distinct storage queue with an associated first, respectively second, distinct queue priority, with the first distinct storage queue and the second distinct storage queue being related to the same predetermined combination of values of the at least one connection parameter, the first distinct queue priority and the second distinct queue priority are adaptable after each grant cycle; and wherein the data transmission apparatus has a corresponding apparatus feature.

This feature is especially important for guaranteeing fairness amongst identical ATM service categories, but attributed to packets entering and stored in different interface modules. By letting the priorities of the associated queues, to be adaptable after each grant cycle, fairness amongst the different competing interface modules is now obtained.

In this way, a simple method for implementing this fairness amongst different interface modules, is realised.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 2 shows a detailed embodiment of the queue priority determining means LIM1QPDM1 of the data transmission arrangement DTA of FIG. 1;

FIG. 4 shows a detailed embodiment of the queue priority determining means LIM1QPDM1' of FIG. 3.

BEST MODE FOR CARRYING OUT THE INVENTION

A first variant of the subject method for prioritised data transmission, performed by a corresponding first embodiment of the data transmission arrangement according to the present invention, is used for scheduling ATM data packets or cells of one input bitstream to a common transmission medium being an outgoing data bus. This is for instance used in the downstream direction of an access adapter in an ADSL network, whereby the user data is first demultiplexed amongst the different users, after which step, for each individual user, the ATM data is further scheduled to an individual user data line, taking into account the ATM service category of the data packets for this user. For each user, a first embodiment of the data transmission arrangement of the present invention is thus implemented in the access adapter.

Figure 1:
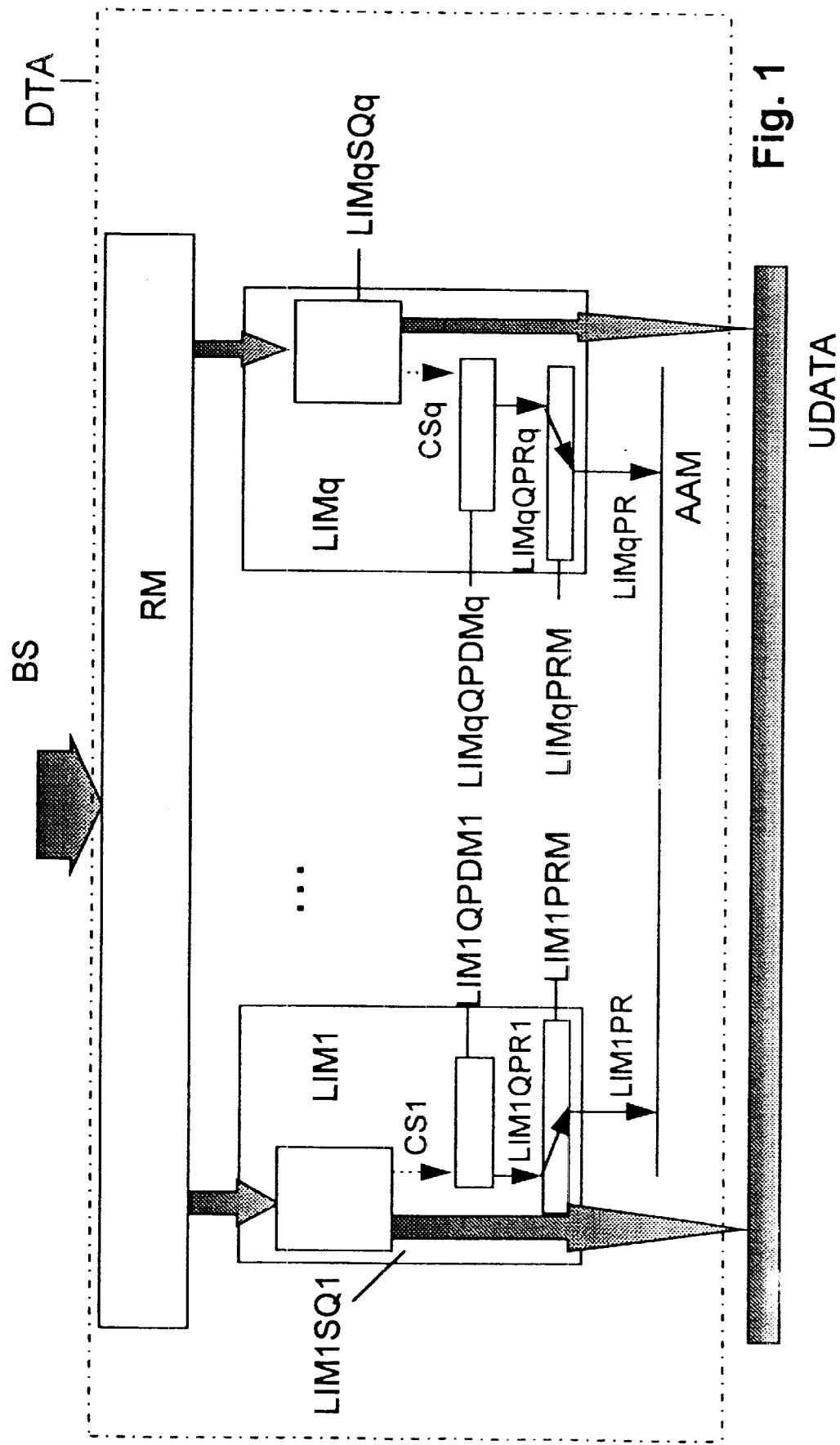
FIG. 1 depicts a schematic of a first embodiment of a data transmission arrangement DTA according to the invention.

The first embodiment of the data transmission arrangement is represented as DTA in FIG. 1, with the input bitstream to it denoted BS and the common transmission medium denoted UDATA.

The first embodiment of the data transmission arrangement DTA in general consists of q interface modules, denoted LIM1 to LIMq in FIG. 1 with q being an arbitrary integer number. Each of these respective interface modules LIM1 to LIMq has an interface module priority, respectively denoted LIM1PR to LIMqPR. Prioritised data transmission, based on priorities, is commonly known and described in for instance the published European Patent Application with application number 92870049.1. In this document, as well as in the first embodiment of the data transmission arrangement, the prioritised access is realised by comparing the interface module priorities, after which step access is granted to one of them, based on a predetermined comparison criterion. In the referenced document, as well as in the first embodiment of the data transmission arrangement DTA, this predetermined comparison criterion consists of selecting the interface module having the maximum amongst all interface module priorities. However other criteria can be used as well in other variants of the first embodiment. Further details concerning the granting of the access, including the use of a dedicated access request interface for priority comparison, are further and extensively described in the referenced document. A similar access interface, in FIG. 1 denoted by AAM, is used as well in the first embodiment of the data transmission arrangement DTA.

In the subject data transmission arrangement the priorities of the interface modules are however dependent upon a number of considered ATM service categories, a feature that was not present in the referenced document. To this purpose each interface module, LIM1 to LIMq includes one storage queue, denoted by LIM1SQ1 for LIM1, LIM2SQ2 for LIM2 (not shown on FIG. 1) to LIMqSQq for LIMq, which are used for temporary storing ATM cells of the incoming bitstream BS, and which individually correspond to a distinct ATM service category. In this first embodiment of the data transmission system, LIM1SQ1 and LIM1 thus correspond to ATM service category 1, LIM2SQ2 and LIM2 correspond to ATM service category 2, etc. and LIMqSQq and LIMq correspond to ATM service category q.

In general the ATM service category is determined by the value of the following parameters: cell delay variation, cell transfer delay, cell loss ratio, peak cell rate, sustainable cell rate, maximum burst size, minimum cell rate and cell delay variation tolerance, as is commonly known by a person skilled in the art. Depending on which value is specified or not, and on the specific value of these parameters, following commonly known and standardised by the ATM-Forum by specification AF-TM-0056.000 dated April 1996, ATM service categories are considered: constant bit rate, abbreviated by CBR, real-time variable bit rate, abbreviated by RT-VBR, non-real-time variable bit rate, abbreviated by NRT-VBR, available bit rate, abbreviated by ABR, and unspecified bit rate, abbreviated by UBR.

In this first embodiment these standardised ATM service categories are completed by some extra, user-specified service categories. This results in q=8 ATM service categories considered in a first variant of the first embodiment. However, this number can be easily extended for dealing with some extra user-defined or future standardised categories, by inserting extra interface modules.

In order to know which ATM service category is associated to an incoming cell or packet from bitstream BS, the value of the above named connection parameters, included in each cell under the form of some predetermined bits in the header, is first individually checked. This is performed by means of a routing means, in FIG. 1 depicted as RM. Based on the combination of the values of these connection parameters, the corresponding ATM service category associated to the checked cell is then determined, after which step this cell is further routed towards the interface module and storage queue associated to the thus determined ATM service category. These latter actions are performed by the routing means RM as well. From the above mentioned functional description, the realisation of such a routing means is commonly known to a person skilled in the art. Therefore embodiments of such a routing means are considered common knowledge and will not be further described into detail in this document.

In the first embodiment of the data transmission arrangement DTA, each interface module priority LIM1PR to LIMqPR is determined as a distinct queue priority, denoted LIM1QPR1 to LIMqQPRq, associated to the respective distinct storage queues LIM1SQ1 to LIMqSQq, which are included in each distinct interface module. To this purpose, within each distinct interface module LIM1 to LIMq, a distinct queue priority determining means LIM1QPDM1 to LIMqQPDMq is included which is adapted to calculate the respective distinct storage queue priority values LIM1QPR1 to LIMqQPRq. Since in this first embodiment the interface module priorities correspond to the thus determined distinct queue priorities, the interface module priority means, depicted LIM1PRM to LIMqPRM in FIG. 1 and adapted for determining the individual interface module priorities LIM1PR to LIMqPR from the distinct queue priorities LIM1QPR1 to LIMqQPRq, are very simple, and in some variants merely consist of the necessary circuitry for transmitting the distinct queue priority to the access interface, interpreting some signals sent back from this access interface (not shown in FIG. 1), and thereby generating other control signals (not shown in FIG. 1) for enabling the transmission of cells of the corresponding storage queue to the common data bus UDATA. In other variant embodiments these interface module priority means can further include some timing synchronisation circuitry adapted to control and enable the simultaneous delivery of the individual interface module priority signals to the access interface AAM. Again, the realisation of such circuits is commonly known to a person skilled in the art, and will therefore not be further considered in this document.

In the first embodiment of the data transmission arrangement DTA, the access to the common transmission medium UDATA is thus entirely based on the queue priorities, LIM1QPR1 to LIMqQPRq, which are determined by respective distinct queue priority determining means, LIM1QPDM1 to LIMqQPDMq. Access is granted in this first embodiment to the interface module having the highest interface module priority with each module corresponding to a distinct ATM service category. In a first variant of the first embodiment, dealing with q ATM service categories and thus including q storage queues, the individual queue priority values attributed to non-empty queues, are merely distinct fixed integer values in the range 1 to q, with 1 corresponding to the ATM service category being the least delay sensitive and consequently attributed to the lowest priority, and with q corresponding to the ATM service category being the most delay sensitive and consequently being attributed to the highest priority. A priority value of 1 can for instance be attributed to the unspecified bit rate category UBR, whereas a priority value of q may be attributed to the CBR category.

Each of the distinct queue priority determining means in this first variant of the first embodiment then merely consists of a memory register storing the corresponding associated priority value, a detection means for checking the status of the associated storage queue, as well as output means for delivering the appropriate queue priority to the interface module priority means. The detection means checks whether the associated storage queue is empty, upon this condition the associated storage queue or interface module priority is for instance set to 0.

In a second variant of the first embodiment, for some queues, such as the one associated with the ABR service category, the associated storage queue priority for non-empty queues is selected from two distinct fixed integer values. This mechanism is foreseen for these ATM service categories which are normally only getting the remaining bandwidth after the other guaranteed bandwidth service categories such as the CBR category, are served. In order to guarantee the minimum cell rate specified for these categories, the priority associated to this categories is then temporary increased at predetermined instances, such that at these predetermined instances at least one increased-priority cell is enabled to be transmitted from the corresponding storage queues to the common data bus UDATA.

Depending on which ATM service categories need this mechanism, the corresponding amount of priority values has to be determined and attributed to these specific ATM service category. For instance, if only the ABR and a user-specific ATM service category are selected for having this double-priority method, q+2 priority values are to be foreseen, for instance lying between 1 and q+2.

This situation may also be represented as if two priority subclasses are associated to these specific ATM service categories: the normal low-priority so-called non-guaranteed cell-rate subclass and a artificially introduced guaranteed cell-rate subclass. In general, the guaranteed cell rate subclass priority results in a higher access probability to the data bus compared to the non-guaranteed cell rate subclass priority, attributed to the same ATM service category.

Remark that this mechanism does not have to be restricted to two priority values associated to each of the considered storage queues, but that an arbitrary amount of priority values can be attributed to each of these ATM service categories, thereby fine-tuning the method.

In another third variant of the first embodiment, this two-priority switchover principle is generalised for all ATM service categories, with the guaranteed cell rate priority subclasses having corresponding priority values lying between q+1 and 2 q, and the non-guaranteed cell rate priority subclasses having priority values lying between 1 and q. Since for some service categories, e.g. CBR, the non-guaranteed subclass in fact makes no sense, this subclass and consequently the priority switchover between the non-guaranteed and the guaranteed priority value, is therefore not used. For this ATM service category, always the highest guaranteed cell priority is applied. Similarly, for the UBR class, the non-guaranteed subclass priority is always applied.

For these storage queues and associated ATM service categories, to which the double-priority value mechanism is applicable, the associated queue priority determining means includes a selection unit, adapted to select one out of the two attributed priority values stored in a memory which is part of the queue priority determining means as well. This selection means is controlled by a programmable counter. Each time this counter has counted a programmable predetermined number of clock pulses, it generates a trigger signal for the selection means. On receipt of this trigger pulse, the selection means chooses the guaranteed cell rate subclass priority, to be output as the queue priority value. At all other instances, the non-guaranteed cell rate priority subclass, in the first embodiment corresponding to the lowest of both priority values, is output as the queue priority value. The predetermined number of clock pulses, being the programmable counting value, is further dependent upon the ATM service category itself. This allows to temporarily favour some ATM service categories to which the priority switchover mechanism is applicable with respect to each other for gaining the access. Indeed, the shorter the counting period of the counter, the more often the guaranteed cell rate priority subclass value is output at the interface module priority means, and thus the larger the probability that this interface module will gain the access.

In a fourth variant of the first embodiment this method is even refined to guarantee a certain predetermined amount of cells per queue, denoted by B1SQ1 to BqSQq for the respective distinct storage queues LIM1SQ1 to LIMqSQq, to be attributed with their corresponding guaranteed cell rate subclass priority values. This predetermined amount of cells per queue is again programmable and dependent upon the considered ATM service category, to again introduce the possibility of favouring some service categories with respect to each other. A control signal transmitted from each distinct storage queue to the corresponding distinct queue priority determining means, in FIG. 1 denoted CS1 for LIM1SQ1 to CSq for LIMqSQq, informs each distinct queue priority determining means upon a cell being sent from the corresponding storage queue, in order to allow each queue priority determining means to count the amount of cells sent with the guaranteed cell rate subclass priority value.

FIG. 2 depicts an implementation of the queue priority determining means LIM1QPDM1 of FIG. 1 as included in this fourth variant of the first embodiment. This queue priority determining means LIM1QPDM1 includes a first programmable counter, denoted CT1SQ1, which counts for a predetermined number T1SQ1 of clock periods. This predetermined number of clock periods is user-programmable and may for instance be loaded into this first programmable counter at the start of the operation of the data transmission arrangement. Remark that, in order to not overload the drawing, the clock input of this counter is not shown in FIG. 2

The output signal of this first programmable counter is coupled to the Load input, denoted by L, of a second load programmable counter, denoted LPC1. If the predetermined number T1SQ1 of clock periods of the first counter LPC1 have elapsed, the signal arriving at the L input of the second counter triggers this second counter to load the value B1SQ1 stored in a memory denoted MB1SQ1, to be the starting value of this second programmable counter. B1SQ1 thus corresponds to the predetermined amount of cells to be attributed with the guaranteed cell rate subclass priority values of storage queue LIM1SQ1, during the T1SQ1 clock pulses. This value is user-programmable as well and may also be loaded into the memory MB1SQ1 during initialisation of the arrangement, and at connection set-up time. This second programmable counter LPC1, decrements its output value, starting from B1SQ1, with 1, each time a cell from the corresponding queue LIM1SQ1 is sent. The latter is indicated by the value of the CS1 signal, from storage queue LIM1SQ1 towards the D-input of the second programmable counter LPC1 as is shown in FIG. 2. The output signal of this second programmable counter, as delivered at the Q output terminal, is then checked in a comparator, denoted by COMP. In case the comparator output signal indicates that the output signal of the second counter is still positive, meaning that all B1SQ1 cells are not yet transmitted, the guaranteed cell rate subclass priority is selected to be the final queue priority LIM1QPR1. This selection is performed by a selection unit, in FIG. 2 denoted by MUX1 having as input data on one hand the value GPR1 stored in a first memory location GCR1, with GPR1 representing the associated guaranteed cell-rate priority for the service category to which LIM1 corresponds, and on the other hand the value NGPR1, stored in a second memory location, denoted NGCR1, and representing the associated non-guaranteed cell-rate priority of this same service category. Remark that both GPR1 as well as NGPR1 are both again user-programmable, in the fourth variant of the first embodiment with GPR1 being larger that NGPR1 in order to attribute B1SQ1 cells of storage queue LIM1SQ1 with a higher priority during the T1SQ1 clock pulses of the first programmable counter. The selection is performed by the coupling of the output signal of the comparator COMP to the selection input, denoted S in FIG. 2, of the selection means MUX1. Whenever this signal is indicative of the Q output of the second programmable timer to be positive, the GPR1 value is selected as the queue priority LIM1QPR1; if the selection input value is indicative of a negative value of the Q output of the second programmable timer, the non-guaranteed cell rate priority NGPR1 is selected for being the queue priority LIM1QPR1.

The result is that during the first counter period, the corresponding predetermined amount of cells, if available in the associated storage queue, is attributed the guaranteed cell-rate priority subclass value, whereas an undefined number of other cells of the same storage queue are attributed with the non-guaranteed cell rate priority subclass values. Whether the storage queues are empty or not, is indicated by means of another control signal, not shown on FIG. 2. In case of an empty storage queue, a predetermined lowest priority value, or, in general a priority value resulting in the least probability of access, is output by the corresponding queue priority determining means, as was already explained in a previous paragraph. In case not the total predetermined amount of cells are transmitted with the higher priority during the predetermined number of clock pulses of the first programmable counter, during the next cycle of the T1SQ1 clock pulses of the first counter, the second counter is loaded again with B1SQ1, during which cycle these cells can again be transmitted at this higher priority.

Remark that on FIG. 2 the logic for generating the "empty queue" priority value is not shown. This value can be easily generated by for instance inverting the (not shown) empty-queue signal and further AND-ing this inverted empty queue signal with the output value of the selection unit. By this a zero-value empty queue priority is generated at these occasions for a positive value of the empty queue signal. However other implementations are possible and trivial to a person skilled in the art.

For this fourth variant of the first embodiment of the data transmission arrangement, the sum of the predetermined amount of cells to be attributed with the "guaranteed cell-rate subclass priorities", over all ATM service categories has to be smaller than the ATM user line rate of the common transmission medium UDATA since no overbooking is allowed for these categories. This can be represented by the following mathematical representation:

$$\sum_{i=1}^{q}\left(\frac{BiSQi}{TiSQi \cdot T}\right) \leq \text{Line Rate of } UDATA$$

whereby BiSQi corresponds to the predetermined amount of cells to be transmitted from storage queue i, at the guaranteed cell rate subclass priority value, whereby TiSQi corresponds to the predetermined amount of clock pulses the first programmable counter associated to storage queue I, is counting down, and whereby T corresponds to the time of one clock period of this first programmable counter, and has to be guaranteed by the connection admission control function, present in another part of the network of which the data transmission system according to the invention forms part. This is necessary to not exceed the allowed number of cells to be transmitted over the common transmission medium.

Remark that by further introducing some feedback concerning the status of the queues itself for determining this programmable predetermined amount of cells to be attributed and transmitted at the guaranteed cell rate subclass priority value, or to the predetermined number of clock periods of the first programmable counter, the method and the arrangement may even be more refined.

A second embodiment of a data transmission arrangement according to the subject invention is used in the upstream direction of the same access adapter in an ADSL network, now multiplexing up to 576 ADSL lines on a single network interface, using the ATM technique. In this second embodiment again the same ATM service categories as described for the first embodiment of the data transmission arrangement are supported.

Figure 3:
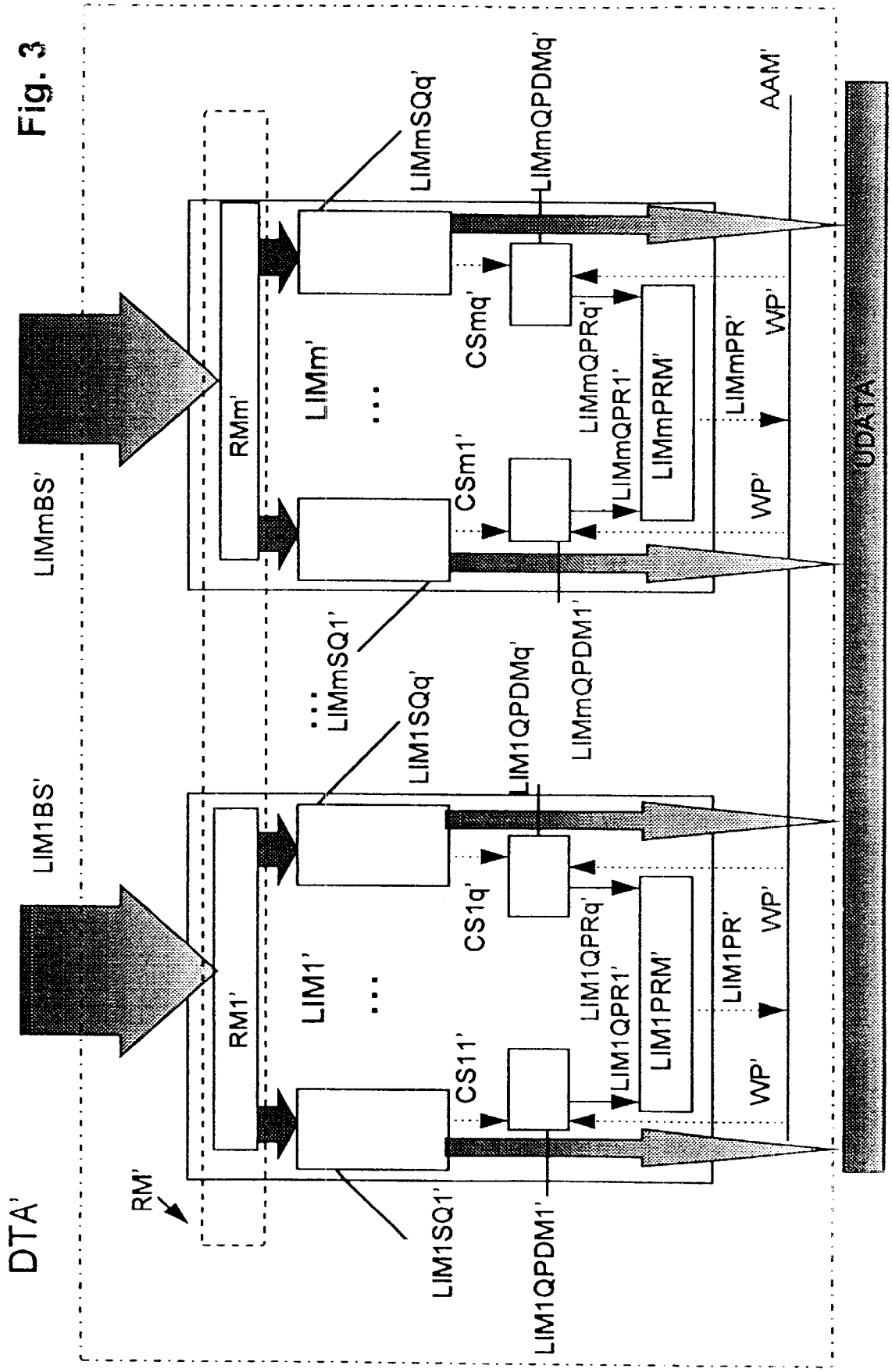
FIG. 3 depicts a schematic of a second embodiment of a data transmission arrangement DTA' according to the invention.

A schematic of this second embodiment of the data transmission arrangement denoted DTA' is shown in FIG. 3. Therein, each interface module, denoted LIM1' to LIMm', now includes q distinct storage queues, denoted LIM1SQ1' to LIM1SQq' for the first interface module LIM1' to LIMmSQ1' and LIMmSQq' for the mth interface module LIMm'. In this second embodiment, q, the number of storage queues per interface module, again corresponds to the number of supported ATM service categories. As for the first embodiment, q=8, but this can be easily extended by adding extra storage queues within each interface module.

In this embodiment ATM cells or packets of separate incoming bitstreams, denoted LIM1BS' for the first interface module LIM1' to LIMmBS' for the mth interface module LIMm', are transmitted towards a common transmission medium, denoted UDATA' in FIG. 3, using an access method which is again based on priorities of the individual interface modules. Again these interface module priorities, denoted LIM1PR' for LIM1' to LIMmPR' for LIMm' are made dependent upon the different considered ATM service categories associated to at least part of the packets of the individual incoming bitstreams. To this purpose, these packets are first routed towards the appropriate storage queue, which are also uniquely attributed to a specific ATM service category. Storage queues LIM1SQ1', LIM2SQ1' (not shown on FIG. 3) and LIMmSQ1' for instance all correspond to ATM service category 1, storage queues LIM1SQ2' to LIMmSQ2' (not shown on FIG. 3) correspond to ATM service category 2, etc., and storage queues LIM1SQq' to LIMmSQq' correspond to ATM service category q. To route the individual packets of the incoming ATM input bitstreams towards the appropriate storage queues on the basis of at least one connection parameter indicating the associated ATM service category, an interface module routing means denoted RM1' to RMm' is included within each respective interface module LIM1' to LIMm'. The plurality of these interface module routing means then forms the routing means RM' of the data transmission arrangement DTA'. Each individual interface module routing means RM1' to RMm' is comparable to the routing means RM described for the first embodiment of the data transmission arrangement DTA in a previous paragraph.

In the second embodiment DTA' of the data transmission arrangement, a distinct queue priority, denoted LIM1QPR1' to LIM1QPRq' for respective storage queues LIM1SQ1' to LIM1SQq', to LIMmQPR1' to LIMmQPRq' for respective storage queues LIMmSQ1' to LIMmSQq' is determined for each of the mxq distinct storage queues. This is performed by an associated distinct queue priority determining means, denoted LIM1QPDM1' to LIMmQPDMq', which is included in the same interface module as the associated storage queue. After the individual distinct queue priorities of the associated distinct storage queues within an interface module have been determined, the interface module priority is derived from them, according to a predetermined algorithm. In a first variant of the second embodiment of the data transmission arrangement DTA', this predetermined algorithm again consists of selecting the maximum amongst all individual distinct storage queue priorities determined within one respective interface module. However other algorithms can be used as well in other variants of this second embodiment. In general these algorithms are related to the predetermined comparison criterion used for determining access to the common transmission medium UDATA', from the resulting interface module priorities, although this is not a prerequisite.

The determination of the respective interface module priority values from the distinct queue priorities, is performed within each interface module by means of an interface module priority means, denoted LIM1PRM' for the first interface module LIM1' to LIMmPRM' for the mth interface module LIMm'.

As was the case for the first embodiment of the data transmission arrangement, access to the common transmission medium UDATA' is performed by the known method of comparing the individual interface module priorities and selecting one of them based on a predetermined comparison criterion. In a first variant of the second embodiment DTA' this predetermined comparison criterion again consists of selecting the interface module having the highest interface module priority value, whereby this access arbitration function is again performed by means of a dedicated access interface, denoted AAM' in FIG. 3, similar to the one that was already described for the first embodiment of this data transmission arrangement. However in other variant embodiments other comparison criteria may be used.

The individual distinct storage queue priorities LIM1QPR1' to LIMmQPRq' are determined according to several principles. A first one, used in some variants of the second embodiment, is similar to the one already described for the first variant of the first embodiment, and involves that each ATM service category is associated to a separate priority range. In the first embodiment this range could be reduced to one single integer value, since there were no competing interface modules with a similar ATM service category storage queue. This situation is however different in the second embodiment, therefore a range of values is associated to each ATM service category, whereby in some other variant embodiments these ranges have non-overlapping values. These non-overlapping ranges not only directly reflect the ATM service categories from the priority values, it also seriously eases the already mentioned connection admission control function that needs to be performed in the network of which also this embodiment of the data transmission arrangement forms part.

Since in the first variant of the second embodiment again access is granted to the unit with the highest priority, the ATM service category requiring the lowest delay, needing to be served first under all circumstances, will thus be attributed to the priority ranges with the highest values.

A second principle, also used and described in a previous paragraph, for some variants of the first embodiment of the data transmission arrangement, is the attribution of some ATM service category priority values to two subclasses with which, in yet other variants, two different, non-overlapping ranges are associated. This principle is accompanied by an alternate selection from a value of one of both ranges for the determination of the distinct storage queue priority. Also this principle can be further refined in yet other variant embodiments by allowing the predetermined instances at which this switchover from one range to the other occurs, to be dependent on the ATM service category itself, and on a predetermined amount of cells to be transmitted from the associated storage queue, as was also described for the first embodiment in a previous paragraph of this document.

The first and the second mentioned principles and their refinements however are not sufficient for granting fair access between queues associated to identical ATM service categories, but part of different interface modules. To cope with this issue, the respective queue priorities of distinct storage queues associated to the same ATM service category, but included in different interface modules, for instance LIM1SQ1', LIM2SQ1' (not shown on FIG. 3) and LIMmSQ1', are therefore made adaptable after each grant cycle. The adaptation being such that, when a packet or cell is transmitted from one of these queues, the queue priority of this one queue is reset to the lowest value within its associated range, whereas in all other interface modules, the priority of this queue associated to the same ATM service category, is increased within its range for generating a priority with a higher access probability. This principle is called ageing, and is thus used for fairness between competing modules with storage queues associated to the same ATM service category. This is the reason why in fact each queue is attributed at least one range of values, in stead of some predetermined integer numbers, from which the priority is selected. In these embodiments where the interface module with the maximum interface module priority is granted access to the common transmission medium, the storage queue having transmitted a cell will send a control signal to the associated queue priority determining means for resetting the corresponding queue priority towards the lowest value within its range. These control signals between the storage queues and the associated queue priority determining means are denoted CS11' to CS1q' for respective storage queues LIM1SQ1' to LIM1SQq' to CSm1' to CSmq' for respective storage queues LIMmSQ1' to LIMmSQq' on FIG. 3.

For the other interface modules including a storage queue associated to the same ATM category as the storage queue having transmitted a cell, the associated queue priority values are increased, for instance with a predetermined integer number, until the maximum value within the range is used. However other functions for increasing the priority may be used as well in other embodiments. In general these queue priorities are changed to a value guaranteeing a higher access probability to the common transmission medium.

The latter ageing mechanism therefore implies that each queue priority determining means has to be informed about the "winning" priority, as determined by the access interface AAM'. This feedback can be realised by means of m×q individual direct feedback signals between the access-inferface AAM' and the m×q individual queue priority determining means, as is indicated on FIG. 3 by means of the WP' signals, each carrying the winning priority value after each grant cycle. In other variant embodiments, this feedback can also consist of a feedback signal between the access interface and the individual interface module priority means, which are then further adopted to transfer this information back to all or the appropriate storage queues.

It has to be remarked that this ageing mechanism can be used for both the guaranteed cell rate as the non-guaranteed cell rate subclasses. However, for these non-guaranteed cell rate priority subclasses, other priority determining mechanisms such as weighted fair queuing are considered to be more appropriate as is commonly known by a person skilled in the art. Since these mechanisms are extensively described in the literature, they will not be further described in this document.

In the variant of the second embodiment which is used in the ADSL access adapter in the upstream direction, all three mentioned principles as well as all possible refinements for determining the distinct individual queue priorities are combined for generating the final distinct queue priorities. The result is shown on FIG. 4, representing queue priority determining means LIM1QPDM1' associated to storage queue LIM1SQ1' of FIG. 3. The main architecture of this queue priority determining means is similar to the one shown in FIG. 2 for the first embodiment of the data transmission system and basically includes two programmable counters, in FIG. 4 denoted CT1SQ1' for the first programmable counter and LPC11' for the second load programmable counter. As for the first embodiment, the first programmable counter CT1SQ1' counts for T1SQ1' clock periods (clock input not shown on FIG. 4), whereas the second programmable counter LPC11', upon being triggered by the first counter via its load input L', loads its starting value B1SQ1' from a memory MB1SQ1', to its S' input and starts decrementing this initial output value with 1 each time a cell from the corresponding storage queue LIM1SQ1' is transmitted to the common transmission medium UDATA'. This latter information is provided by the CS11' signal, sent by the storage queue LIM1SQ1' towards the D' input terminal of the second programmable counter LPC11'. The starting value B1SQ1' of this second counter is again equal to the predetermined amount of cells to be attributed with and transmitted with a priority of the guaranteed-cell-rate priority subclass, in the access adapter embodiment corresponding to the highest of both priority ranges associated to a particular ATM service category. Similarly, a priority of the lowest of both ranges, or, more in general the non-guaranteed-cell-rate subclass, results in a less access probability.

The output signal of this second programmable counter, appearing on the Q' output terminal of FIG. 4, is coupled to a comparator, COMP', which checks whether the output signal of the second programmable counter LPC11' is still positive. The output signal of the comparator COMP' is a control input signal to a control input terminal S' of a selection device or multiplexer MUX11', which further has two data input lines carrying respective data input signals GPR11' and NGPR11'. Both data input signals, GPR11' and NGPR11' are respectively generated by a guaranteed-cell rate priority means, denoted GCR11' and a non-guaranteed cell rate priority means, denoted NGCR11' on FIG. 4. The guaranteed cell rate priority means, GCR11', includes an ageing counter, denoted AC11', which is resettable upon a cell sent from the corresponding queue LIM1SQ1', and which is incremented with 1 upon a cell of the same ATM service category, but from another interface module, being transmitted. This latter event is detected in this variant embodiment by a second comparator, COMP11', which thereby transmits a control signal denoted WQVLQ11' to the I' input of the ageing counter AC11'.

This ageing counter AC11' determines the least significant bits of the guaranteed-cell rate priority value GPR11'. These least significant bits are denoted LG11' on FIG. 4. This ageing counter is further programmed with an upper limit value, for instance during start-up of the data transmission arrangement, this upper limit thus corresponding to the upper limit value of the least significant bits of the guaranteed cell rate subclass priority associated to the corresponding ATM service category.

The GCR11' device further includes another memory, denoted by MSBGCR11', being programmable and including the four most significant bits of the GPR11' value, represented as MG11'. These are further combined with the least significant bits LG11' generated in the ageing counter, in a combining means COMB', to finally form the value of the guaranteed cell rate subclass priority GPR11'.

The ageing counter AC11' is reset to a predetermined value, in this embodiment being 1, each time a cell of the corresponding storage queue LIM1SQ1' is sent. This is indicated by the value of the signal CS11' between this storage queue and the reset input denoted R' of the ageing counter.

In this embodiment, the most significant bits for generating the guaranteed cell rate subclass priority are unique for each ATM service category. Therefore, the second comparator COMP11', adapted to verify whether the winning priority on the access request interface AAM' was originating from a storage queue associated to the same ATM service category as LIM1SQ1', compares these most significant bits MG11' with the most significant bits of the wining priority data signal WP'. The control signal WQVLQ11' to the I' input of the ageing counter AC11' is such that, if these two most significant bits groups match, the ageing counter AC11' increases its output value LG11' with 1. In the special case where the own priority was the winning priority, this action is performed as well, but however overruled by the resetting of the counter by the CS11' control signal, as previously explained.

The NGCR11' device for determining the NGCR subclass priority may be similar to the GCR' device in some variant embodiments, but may as well include the necessary circuitry for performing weighted fair queuing algorithms, as was already mentioned.

The multiplexer MUX11' finally delivers the queue priority LIM1QPR1' as either the GPR11' or the NGPR11' value, upon control of its control input signal at the S' control input terminal. If the Q' output signal of the counter is still positive, as is detected by the comparator COMP', the GPR11' value is output at the queue priority value; similarly, if the Q' output signal of the counter is negative, meaning that all B1SQ1' cells are transmitted with high priority during the T1SQ1' clock pulses of the first timer, the NGPR11' value is the queue priority value LIM1SQ1'. In case not all B1SQ1' cells are transmitted during the T1SQ1' clock periods of the first timer, the triggering of the first timer again results in B1SQ1' cells to be loaded in the second timer. This means that the guaranteed cell rate subclass priority remains to be assigned.

It has again to be remarked that in FIG. 4 the necessary circuitry for generating the "empty queue" priority value is again not shown in order to not overload the drawings. However the same circuitry as that mentioned for the first embodiment of the data transmission arrangement DTA can be applied in this case as well, besides other possible solutions which are well known to a person skilled in the art. In the described access adapter variant of the second embodiment, the "zero" value is reserved as priority value for the empty queues as well.

It further needs to be remarked that also in this second embodiment the sum of the guaranteed cell rate values, as obtained by dividing the predetermined number of cells to be transmitted with the GCR subclass priority, and denoted BiSQj' for interface module i and storage queue or ATM service category j, by the time period of the corresponding first timer being the product of TiSQj' and T', for interface module i and storage queue or ATM service category j, with T' representing the clock period of the first programmable timer, summed over all ATM service categories q and over all units m, should not exceed the line rate or interface rate at the UDATA bus since for these guaranteed cell rate subclasses no overbooking is allowed. This can again be represented by the following formula:

$$\sum_{j=1}^{q} \sum_{i=1}^{m} \frac{BiSQj'}{TiSQj' \cdot T'} \leq \text{Line Rate } UDATA'$$

whereby BiSQj' corresponds to the predetermined amount of cells to be transmitted from storage queue j of interface module i, at the guaranteed cell rate subclass priority value, whereby TiSQj corresponds to the predetermined amount of clock pulses the first programmable counter associated to storage queue j of interface module i, is counting down, and whereby T' corresponds to the time of one clock period of this first programmable counter associated to storage queue j of interface module i, again, to be guaranteed by the connection admission control function previously mentioned.

It also finally to be remarked that for proper operation of all variants of the first and the second embodiment of the data transmission arrangement, the necessary timing and synchronisation signals need to be provided. Since a person skilled in the art is however familiar with the circuitry necessary for providing these signals, and since these signals and associated circuitry are beyond the scope of the invention, they are not described in this document.

While the principles of the invention have been described above in connection with specific apparatus, it is to be clearly understood that this description is made only by way of example and not as a limitation on the scope of the invention.

What is claimed is:

1. A method for prioritised data transmission to a common transmission medium (UDATA;UDATA') of a plurality of interface modules (LIM1/LIMq;LIM1'/LiMm') coupled to it, and interfacing at least one input bitstream (BS;LIM1BS'/LIMmBS') with said common transmission medium (UDATA;UDATA'), each interface module of said plurality having a module priority (LIM1PR/LIMqPR;LIM1PR'/LIMmPR') on the basis of which access to said common transmission medium is arbitrated during a grant cycle, characterised in that for at least one interface module (LIM1;LIM1') amongst said plurality, the module priority (LIM1PR;LIM1PR') is dependent on at least one connection parameter associated to packets of said at least one input bitstream (BS;LIM1BS'/LIMmBS'), and further characterised in that said method includes a first step of routing at least part of said packets of said at least one input bitstream (BS;LIM1BS'/LIMmBS') into at least one storage queue (LIM1SQ1; LIM1SQ1'/LIM1SQq') of said at least one interface module (LIM1;LIM1'), based on the values of said at least one connection parameter, whereby each distinct storage queue (LIM1SQ1; LIM1SQ1'/LIM1SQq') amongst said at least one storage queue corresponds to a distinct predetermined combination of values of said at least one connection parameter, whereby for said each distinct storage queue (LIM1SQ1;LIM1SQ1'/LIM1SQq'), a distinct queue priority (LIM1QPR1:LIM1QPR1'/LIM1QPRq') associated to said each distinct storage queue (LIM1SQ1;LIM1SQ1'/LIM1SQq') is determined, from which said interface module priority (LIM1PR;LIM1PR') of said at least one interface module (LIM1;LIM1') is further determined.

2. A method according to claim 1 characterised in that in case said at least one storage queue consists of one storage queue (LIM1SQ1), said interface module priority (LIM1PR) corresponds to the queue priority (LIM1QPR1) associated to said one storage queue.

3. A method according to claim 1 characterised in that for said each distinct storage queue (LIM1SQ1;LIM1SQ1'/LIM1SQq'), said distinct queue priority (LIM1QPR1;LIM1QPR1'/LIM1QPRq') is selected from a distinct predetermined set of values.

4. A method according to claim 3 characterised in that said distinct predetermined sets of values, related to said distinct storage queues are non-overlapping.

5. A method according to claim 1 characterised in that for at least one specific storage queue (LIM1SQ1;LIM1SQ1') amongst said at least one storage queue, the queue priority associated to said at least one specific storage queue (LIM1QPR1;LIM1QPR1'), is adapted at predetermined instances.

6. A method according to claim 5 characterised in that said predetermined instances are related to said at least one specific storage queue (LIM1SQ1;LIM1SQ1').

7. A method according to claim 6 characterised in that said predetermined instances are further related to a predetermined amount of cells (B1SQ1;B1SQ1') to be transmitted from said at least one specific storage queue (LIM1SQ1;LIM1SQ1').

8. A method according to claim 6 characterised in that the respective queue priority (LIM1QPR1;LIM1QPR1') associated to said at least one specific storage queue, is alternatively selected, at said predetermined instances from at least two predetermined sets of values, each of which is related to said at least one respective storage queue (LIM1SQ1;LIM1SQ1').

9. A method according to claim 8 characterised in that for said at least one specific storage queue (LIM1SQ1;LIM1Q1'), said at least two predetermined sets of values are non-overlapping.

10. A method according to claim 1 characterised in that for said method being applicable to a first interface module (LIM1') and a second interface module (LIMm') of said plurality, each respectively including a first, respectively a second, distinct storage queue (LIM1SQ1';LIMmSQ1') with an associated first, respectively second, distinct queue priority (LIM1QPR1';LIMmQPR1'), with said first distinct storage queue (LIM1SQ1') and said second distinct storage queue (LIMmSQ1') being related to the same predetermined combination of values of said at least one connection parameter,
said first distinct queue priority (LIM1QPR1') and said second distinct queue priority (LIMmQPR1') are adaptable after each grant cycle.

11. A method according to claim 10 characterised in that, said first distinct queue priority (LIM1QPR1') is adapted after said grant cycle towards a value guaranteeing a lower probability of access in case said first interface module (LIM1') has transmitted at least one packet from said first distinct storage queue (LIM1SQ1') during said grant cycle, whereby said second distinct queue priority (LIMmQPR1') is adapted towards a value guaranteeing a higher probability of access after said grant cycle.

12. A method according to claim 11 characterised in that said second distinct queue priority (LIMmQPR1') is not adapted in case said second distinct storage queue (LIMmSQ1') is empty.

13. A data transmission arrangement (DTA;DTA') including a plurality of interface modules (LIM1/LIMq;LIM1'/LIMm'), for interfacing at least one input bitstream (BS;LIM1BS'/LIMmBS') with a common transmission medium (UDATA;UDATA'), each interface module (LIM1/LIMq;LIM1'/LIMm') including at least one storage queue (LIM1SQ1/LIMqSQq;LIM1SQ1'/LIMmSQq') adapted to store packets of said at least one input bitstream (BS;LIM1BS'/LIMmBS'), prior to accessing said common transmission medium (UDATA;UDATA'), said each interface module having a respective module priority (LIM1PR/LIMqPR;LIM1PR'/LIMmPR') on the basis of which access to said common transmission medium (UDATA;UDATA') is arbitrated during a grant cycle, and which is determined by an interface module priority means (LIM1PRM/LIMqPRM;LIM1PRM'/LIMmPRM') included in said each interface module, characterised in that, for at least one interface module (LIM1;LIM1') amongst said plurality, the module priority (LIM1PR;LIM1PR') is dependent on at least one connection parameter associated to said packets of said at least one input bitstream (BS;LIM1BS'/LIMmBS'), and further characterised in that said data transmission arrangement further includes routing means (RM;RM'), adapted to route at least part of said packets of said at least one input bitstream (BS;LIM1BS'/LIMmBS') towards said at least one storage queue (LIM1SQ1;LIM1SQ1'/LIM1SQq') included in said at least one interface module, based on the value of said at least one connection parameter, whereby each distinct storage queue (LIM1SQ1;LIM1SQ1'/LIM1SQq') amongst said at least one storage queue of said at least one interface module (LIM1;LIM1') corresponds to a distinct predetermined combination of values of said at least one connection parameter, and is further associated to a distinct queue priority determining means (LIM1QPDM1; LIM1QPDM1'/LIM1QPDMq') included in said at least one interface module (LIM1;LIM1') and being adapted to calculate a distinct queue priority (LIM1QPR1;LIM1QPR1'/LIM1QPRq') associated to said each distinct storage queue (LIM1SQ1;LIM1SQ1'/LIM1SQq'), whereby said interface module priority means (LIM1PRM;LIM1PRM') of said at least one interface module (LIM1;LIM1') is further adapted to determine said interface module priority (LIM1PR;LIM1PR') from each of said distinct queue priorities (LIM1QPR1; LIM1QPR1'/LIM1QPRq') associated to said each distinct storage queue (LIM1SQ1; LIM1SQ1'/LIM1SQq') of said at least one interface module (LIM1;LIM1').

14. A data transmission arrangement (DTA) according to claim
characterised in that in case said at least one storage queue consists of one storage queue (LIM1SQ1), said interface module priority (LIM1PR) corresponds to the queue priority (LIM1QPR1) associated to said one storage queue.

15. A data transmission arrangement (DTA;DTA') according to claim 13
characterised in that each of said distinct queue priority determining means (LIM1QPDM1;LIM1OPDM1'/LIM1OPDMq') is adapted to select said distinct queue priority (LIM1QPR1;LIM1QPR1'/LIM1QPRq') from a distinct predetermined set of values.

16. A data transmission arrangement (DTA;DTA') according to claim 15
characterised in that said distinct predetermined sets of values related to said distinct storage queues, are non-overlapping.

17. A data transmission arrangement (DTA;DTA') according to claim 13
characterised in that for at least one specific storage queue (LIM1SQ1;LIM1SQ1'ω) amongst said at least one storage queue, the queue priority determining means (LIM1QPDM1;LIM1QPDM1') associated to said at least one specific storage queue (LIM1SQ1;LIM1SQ1'), is adapted to change the corresponding queue priority (LIM1QPR1;LIM1QPR1') at predetermined instances.

18. A data transmission arrangement (DTA;DTA') according to claim 17
characterised in that said predetermined instances are related to said at least one specific storage queue (LIM1SQ1;LIM1SQ1').

19. A data transmission arrangement (DTA;DTA') according to claim 18
characterised in that said predetermined instances are further related to a predetermined amount of cells (B1SQ1;B1SQ1') to be transmitted from said at least one specific storage queue (LIM1SQ1;LIM1SQ1').

20. A data transmission arrangement (DTA;DTA') according to claim 18
characterised in that the specific queue priority determining means (LIM1QPDM1;LIM1QPDM1') which is associated to said at least one specific storage queue (LIM1SQ1;LIM1SQ1') is further adapted to alternatively select, of said predetermined instances, said corresponding queue priority (LIM1QPR1;LIM1QPR1') from at least two predetermined sets of values, each of which is related to said at least one specific storage queue (LIM1SQ1;LIM1SQ1').

21. A data transmission arrangement (DTA;DTA') according to claim 20
characterised in that said at least two predetermined sets of values related to said at least one specific storage queue (LIM1SQ1/LIM1SQ1'), are non-overlapping.

22. A data transmission arrangement (DTA') according to claim 13
characterised in that said at least one interface module corresponds to a first interface module (LIM1') and a second interface module (LIMm') of said plurality, whereby a first distinct storage queue (LIM1SQ1') with an associated first distinct queue priority (LIM1QPR1') of said first interface module (LIM1') is related to the same predetermined combination of values of said at least one connection parameter as a second distinct storage queue (LIMmSQ1') with an associated second distinct queue priority (LIMmQPR1') of said second interface module (LIMm'), whereby a first, respectively a second, distinct queue priority determining means, (LIM1QPDM1';LIMmQPDM1'), each respectively included in said first, respectively said second interface module, are respectively adapted to change said first, respectively said second, distinct queue priority (LIM1QPR1';LIMmQPR1'), after each grant cycle.

23. A data transmission arrangement (DTA') according to claim 22
characterised in that in case said first interface module (LIM1') has transmitted at least one packet from said first distinct storage queue (LIM1SQ1'), said first distinct priority determining means (LIM1QPDM1') is adapted to reset said first distinct queue priority (LIM1QPR1') after said grant cycle towards a value guaranteeing a lower probability of access, whereby said second distinct priority determining means (LIMmQPDM1') is adapted to change said second distinct queue priority (LIMmQPR1') after said grant cycle towards a value guaranteeing a higher probability of access.

24. A data transmission arrangement (DTA') according to claim 23
characterised in that said second distinct priority determining means (LIMmQPRDM1') is further controlled by a control signal, indicating whether said second distinct storage queue is empty, thereby not adapting said second distinct priority when said second distinct storage queue is empty.

* * * * *